United States Patent [19]

Armstrong

[11] 4,050,572
[45] Sept. 27, 1977

[54] ACCUMULATOR AND FEEDER

[75] Inventor: Jack W. Armstrong, Baldwinsville, N.Y.

[73] Assignee: Lipe-Rollway Corporation, Syracuse, N.Y.

[21] Appl. No.: 601,298

[22] Filed: Aug. 4, 1975

Related U.S. Application Data

[63] Continuation-in-part of Ser. No. 460,606, April 12, 1974, abandoned.

[51] Int. Cl.² .............................................. B65G 43/08
[52] U.S. Cl. ..................................... 198/347; 198/437; 198/572; 198/751; 198/771
[58] Field of Search .................. 198/34, 37, 76, 220 A, 198/220 BA, 31 AB

[56] References Cited

U.S. PATENT DOCUMENTS

| 3,045,803 | 7/1962 | Bruce | 198/40 |
|---|---|---|---|
| 3,127,029 | 3/1964 | Luginbuhl | 198/31 AB |
| 3,187,878 | 6/1965 | Harrison et al. | 198/37 |
| 3,365,047 | 1/1968 | Schmitz | 198/30 X |
| 3,667,590 | 6/1972 | Mead | 198/220 BA |
| 3,731,787 | 5/1973 | Gregor | 198/37 X |
| 3,789,711 | 2/1974 | Mead | 198/220 BA |
| 3,835,983 | 9/1974 | Horii | 198/220 BA |
| 3,841,471 | 10/1974 | Mead | 198/220 BA |

Primary Examiner—Evon C. Blunk
Assistant Examiner—Richard K. Thomson
Attorney, Agent, or Firm—Stonebraker, Shepard & Stephens

[57] ABSTRACT

An object accumulator and feeder uses a relatively long path divided into a series of independently operable sections. The upper surface of the path is covered with a pile material having bristles with tips supporting the objects and inclined toward a direction of feed, and sections of the path are vibrated to vibrate the bristles against the objects to feed the objects through the sections. A sensor is arranged along the path in each section, and the sensors have one output when an object is present in the sensing region and another output when no object is present in the sensing region. Timers respond to the two-state outputs from the sensors and are in circuit with vibrators for switching vibrators on and off to accumulate the objects by successively filling up the sections from the output end toward the input end of the device, to feed the objects out on demand, and to shut off selected vibrators for intervals during which the vibrators are not needed for advancing the objects.

19 Claims, 12 Drawing Figures

ACCUMULATOR AND FEEDER

RELATED APPLICATIONS

This is a continuation-in-part of my copending parent application, Ser. No. 460,606, filed Apr. 12, 1974, entitled ACCUMULATOR AND FEEDER, and abandoned upon the filing of this application.

THE INVENTIVE IMPROVEMENT

Often during manufacture or processing of objects, one machine or operation puts out objects at a rate different from a succeeding machine or operation so that objects cannot be fed directly from one stage to the next and keep both stages operating at optimum rates. Hence, there is a need for an accumulator and feeder between such stages for accumulating objects supplied by one stage and feeding out objects on demand to the other stage so that both stages can operate at optimum speed. The various circumstances where an appropriate accumulator and feeder can have important advantages include both fast input/slow output, and slow input/fast output, along with other variations such as multiple inputs or outputs, variable rate inputs and outputs, adjusting automatic processing at one stage to manual or variable rate processing at another stage, etc, and all of these variations can be applied to many different objects, feed rates, and operating environments.

The invention involves recognition of these problems and proposes a relatively simple, efficient, and adjustable accumulator and feeder to solve many of them. The invention aims at optimum rate of flow for objects, versatility in feeding different objects, substantial capacity both as an accumulator and a feeder, convenient adaptation to a wide range of circumstances, and capacity for keeping objects oriented along their path of travel.

SUMMARY OF THE INVENTION

The inventive accumulator and feeder includes a relatively long path for accumulating a supply of objects, and the upper surface of the path has a pile material with bristles having tips supporting the objects and being inclined toward a direction of feed. The path is divided into a series of independently operable sections, and each of the sections is vibrated independently to vibrate the pile bristles against the objects to feed the objects through the sections. A sensor is arranged at a sensing region of the path in each of the sections, and the sensors have a two-state output, one of the states being responsive to the presence of one of the objects in the sensing region, and the other state being responsive to the absence of any of the objects in the sensing region. Timers receive and respond to the two-state output from each of the sensors, and the timers are in circuit with the vibrators. The timers switch off a predetermined one of the vibrators at the end of a predetermined interval of a preassociated one of the sensors remaining in the output state responsive to the presence of an object in the sensing region, and the timers switch on a predetermined one of the vibrators at the end of a predetermined interval after a preassociated one of the sensors changes from one output state to the other output state responsive to absence of an object in the sensing region. The switching of the vibrators on and off by the timers is arranged to accumulate the objects by successively filling up sections with objects from the output end toward the input end of the accumulator and feeder, to feed the objects out of the accumulator and feeder on demand, and to shut off selected vibrators for intervals during which the selected vibrators cannot advance the objects.

DRAWINGS

DETAILED DESCRIPTION

Figure 1:
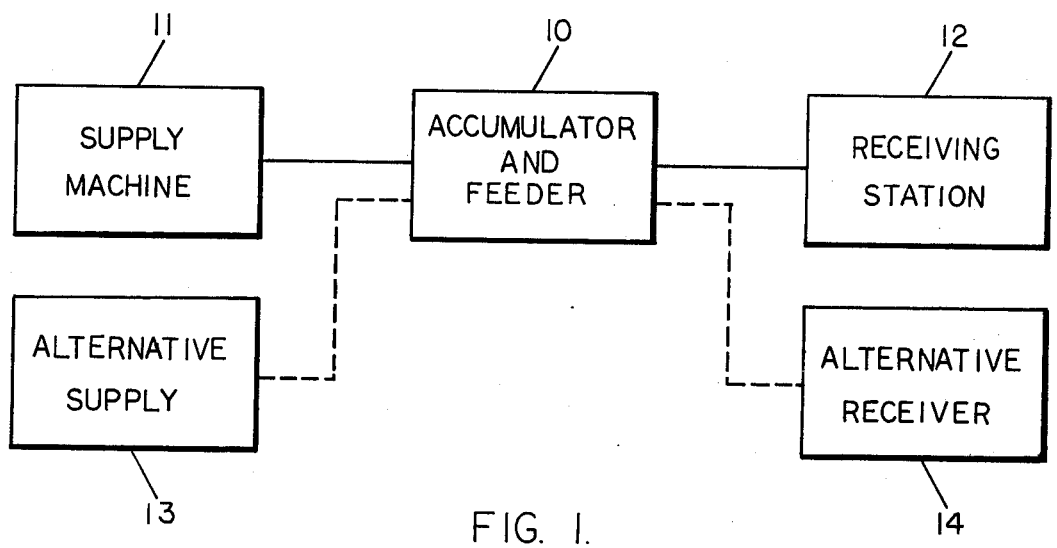
FIG. 1 is a schematic block diagram of the use of the inventive accumulator and feeder.

The inventive accumulator and feeder 10 is positioned between a supply machine 11 or other source of objects being processed, and accumulates the objects and feeds the objects to a receiving station 12 or another machine for subsequent processing of the objects. An alternative supply 13 and an alternative receiver 14 can also be used, and accumulator and feeder 10 can have any number of inputs or outputs to meet different circumstances. Accumulator and feeder 10 has a relatively long through path for accumulating a supply of objects, and is configured to accommodate the particular objects and feeding speeds for each circumstance. The drawings show some of the preferred embodiments of the inventive accumulator and feeder, but many other embodiments of the same basic concept are possible.

Figure 2:
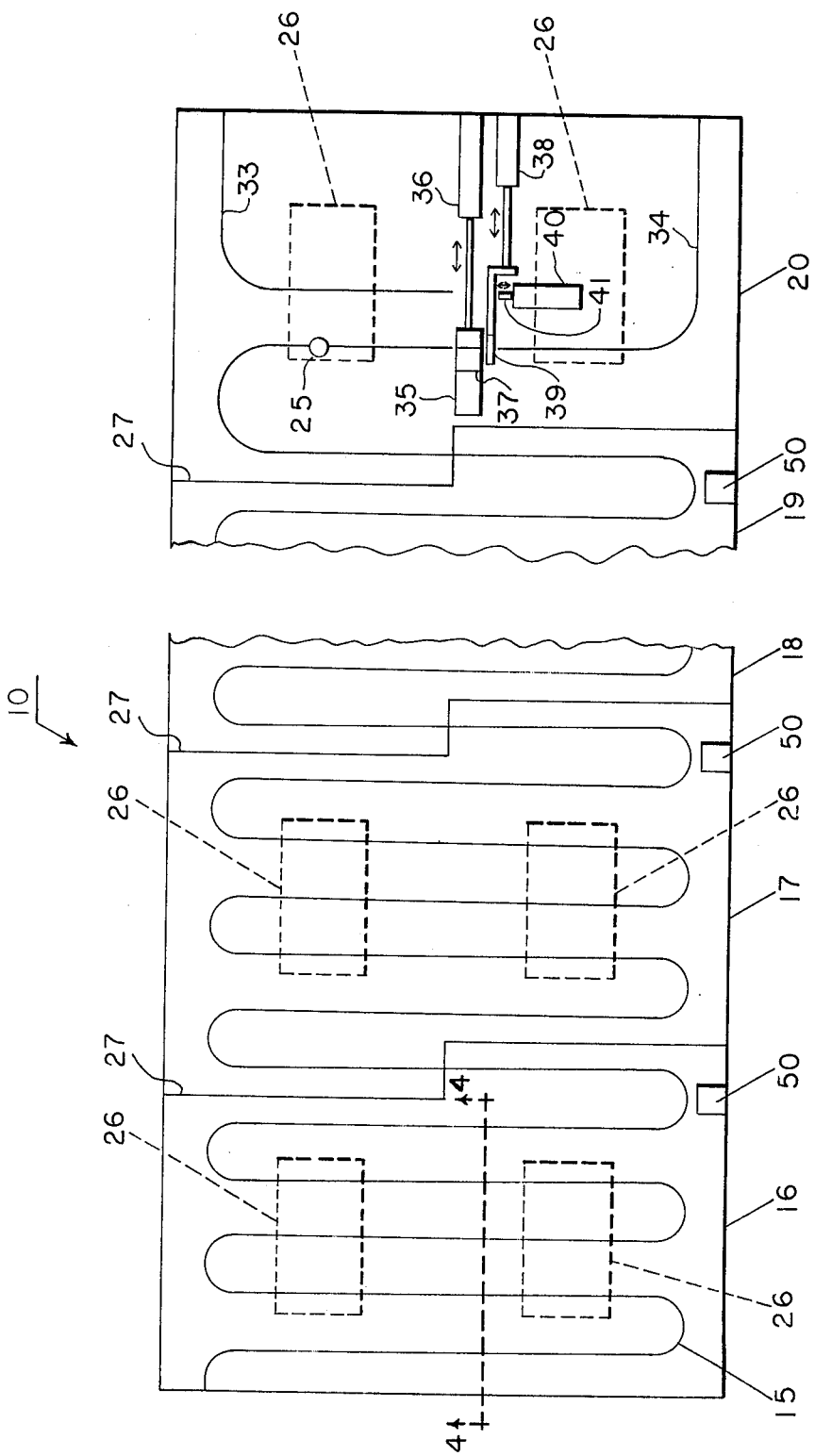
FIG. 2 is a partially schematic, fragmentary plan view of a preferred embodiment of the inventive accumulator and feeder.

As best shown in FIG. 2, accumulator and feeder 10 has a relatively long path 15 formed as multiple S curves leading through an input section 16, intermediate sections 17–19, and an output section 20. Any number of intermediate sections can be used as desired to achieve a satisfactory total length for path 15, and path 15 need not be in multiple S curves as illustrated. Path 15 can be established by guide rails or other barriers so that objects 25 follow the desired route through accumulator and feeder 10, and in the illustrated embodiment, path 15 is formed by a slot 21 receiving stems or projections 22 of objects 25.

Figure 7:
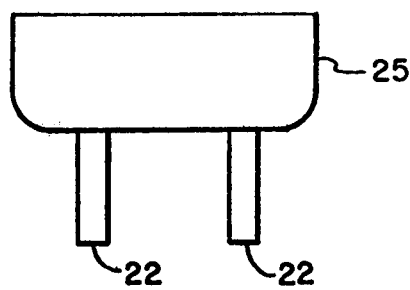
FIG. 7 is a side-elevational view of an orientable object for accumulating and feeding according to the invention.

Slot 21 serves to keep objects 25 oriented throughout the length of path 15, because, as best shown in FIG. 7, objects 25 have a pair of projections 22 that are spaced apart and have an overall dimension between projections 22 that is wider than slot 21 so that projections 22 cannot rotate within slot 21 and can thereby maintain the initial orientation of objects 25. The same effect can be achieved with projections that are relatively flat in one direction and elongated in another direction, such as a ribbon-shaped projection, and for some circumstances, the capacity of slot 21 for maintaining objects 25 in their initial orientation is important. For example, one intended use of accumulator and feeder 10 is for objects 25 in the form of instrument bodies for automobiles, and at the output from accumulator and feeder 10, a soldering operation is performed on each of the instrument bodies 25. Proper orientation of objects 25 is then important to present the objects as facing in the right direction to speed up the soldering operation. Wherever a downwardly extending projection 22 has a dimension wider than slot 21, then use of slot 21 can serve to keep objects 25 oriented for any desirable purpose.

Figure 3:
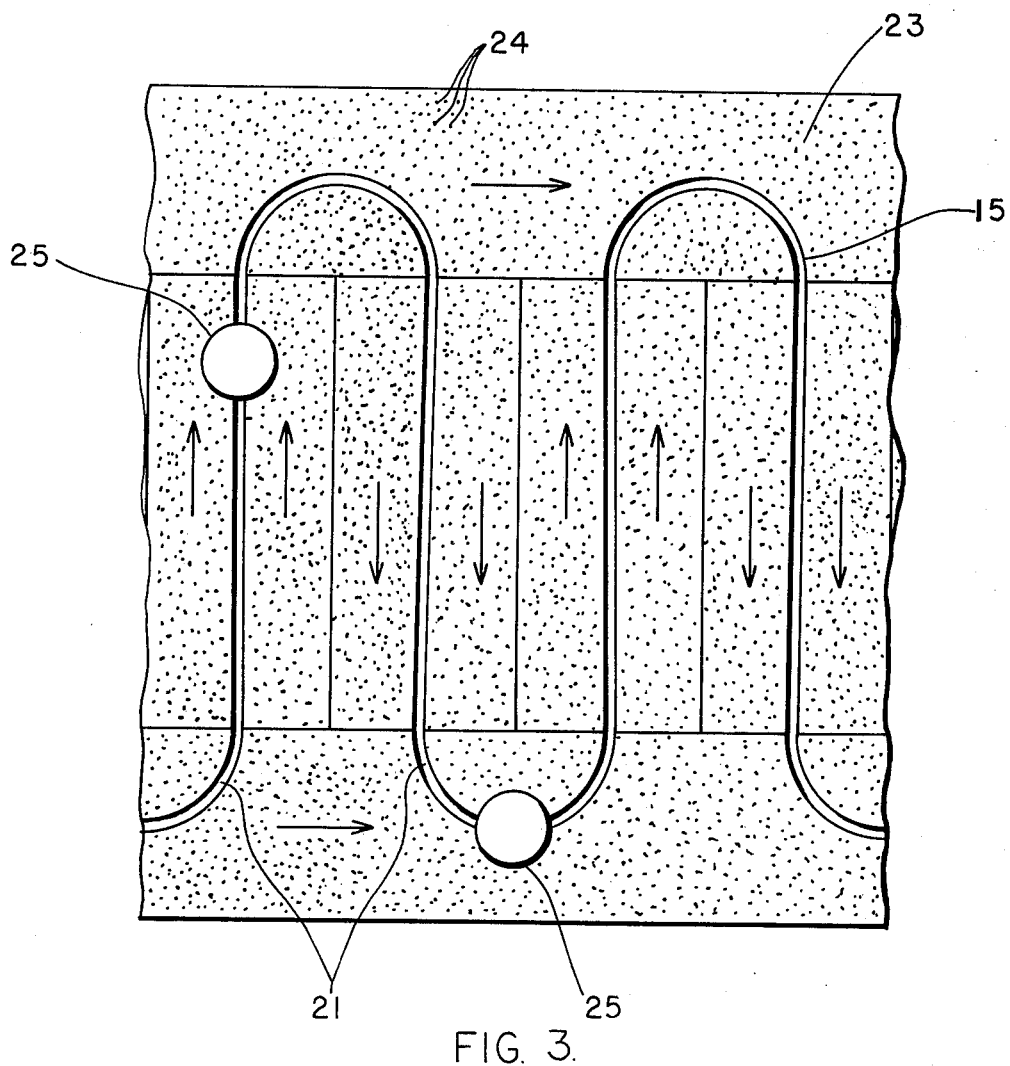
FIG. 3 is a fragmentary plan view of a portion of the feeder of FIG. 2.

The upper surface of accumulator and feeder 10 is covered with a pile material 23 having bristles 24 that support objects 25 on their tips and are inclined toward the desired direction of feed. Bristles 24 are preferably of uniform height and inclination and are dense enough and strong enough to support objects 25 on their tips. As best shown in FIG. 3, pile material 23 is arranged along the slot 21 of path 15 so that bristles 24 are inclined in the direction of the arrows to move objects 25 along the multiple S curves of path 15. Slot 21 is preferably formed by slight separation of individual strips of pile material 23 so that projections 22 of objects 25 extend down into slot 21, and objects 25 are otherwise supported on the tips of bristles 24 adjacent slot 21. Slot 21 maintains the orientation of objects 25 as explained above, and if objects 25 do not have projections, slot 21 can be omitted.

Figure 5:
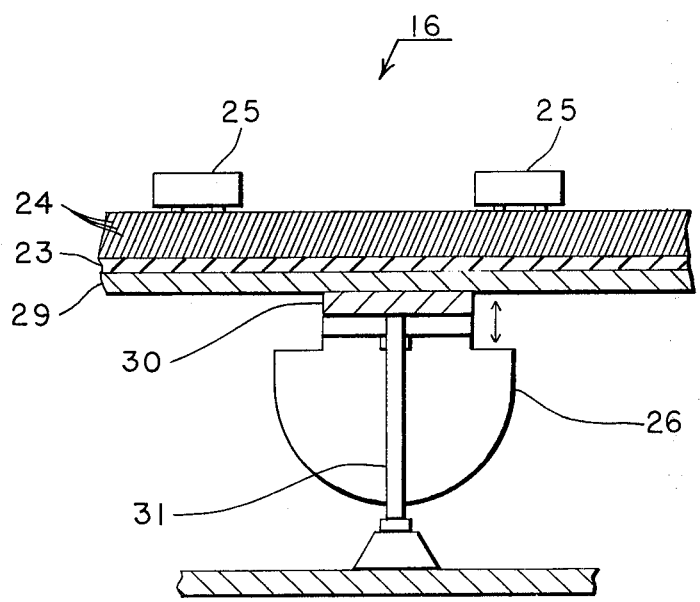
FIG. 5 is a fragmentary side-elevational view of a section of the accumulator and feeder of FIG. 2.

Each of the sections 16–20 of accumulator and feeder 10 are separate and independently operable, and the pile surface 23 of each section is vibrated preferably vertically and reciprocally by vibrators 26 secured to the underside of the feed surface and driven in a vertical vibrational mode as schematically represented by the arrows in FIG. 5. This vibrates bristles 24 against the bottoms of objects 25 and moves objects 25 in the direction of inclination of bristles 24 along the multiple S curve path 15. The junction between section is preferably formed along a line 27 that cuts across path 15 and provides only a narrow gap for objects 25 to span as they proceed from one section to another. Then each section moves objects 25 along to the succeeding section toward the output as described more fully below.

Figure 4:
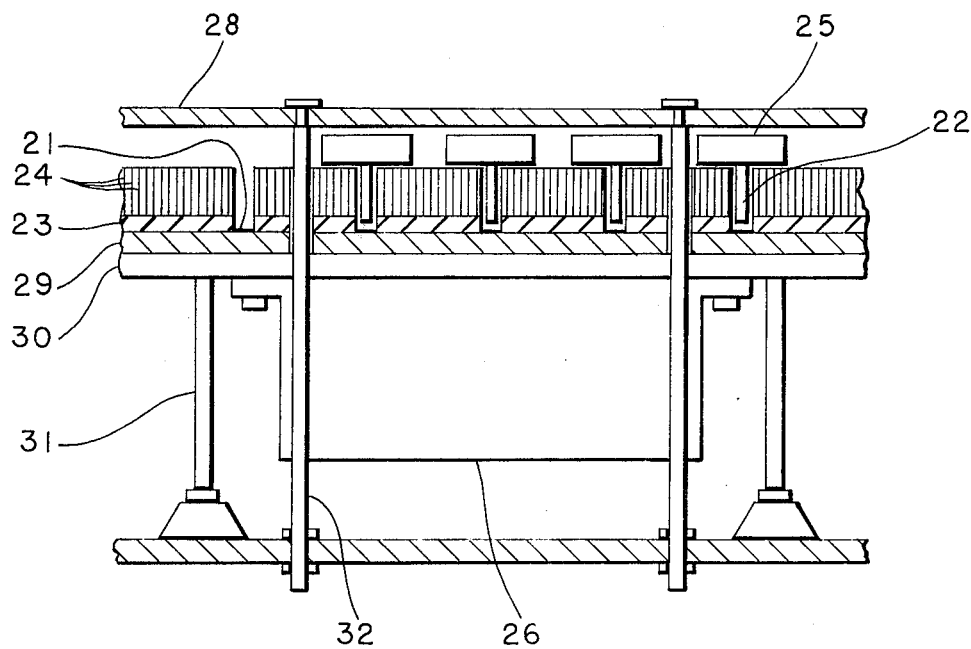
FIG. 4 is a fragmentary cross-sectional view of the feeder of FIG. 2 taken along the line 4—4 thereof.

Several forms of vibrators 26 are commercially available and satisfactory for use in accumulator and feeder 10. The Syntron Company of Homer City, Pa., presently sells a line of vibrators, several of which are satisfactory for vibrators 26. A vertical and reciprocal motion is preferred for vibrator 26, and different frequencies, amplitudes, and power can be used, depending upon the size of each section, the pile bristles being used, and the mass of objects 25. Vibrators 26 can be mounted for both supporting and driving the base 30 supporting the pile material 23, or as preferred and best shown in FIGS. 4 and 5, vibrators 26 can be mounted on base 30 to extend downward from base 30 and vibrate base 30 on its flexible supports 31. One particular form of vibrator 26 that is preferred for accumulator and feeder 10 is Syntron Company Model V-20 vibrator, operating at 3600 vibrations per minute. In addition to electro-mechanical vibrators such as marketed by the Syntron Company, vibrators can be driven mechanically, eccentrically, pneumatically, hydraulically, or electrically through piezoelectric or magnetostrictive devices, and any vibrator that produces a satisfactory frequency and amplitude in a generally vertical and reciprocal motion can be used in accumulator and feeder 10.

A path with a slot 21 accommodates objects 25 that can be stably suported in the illustrated position with a stem or projection 22 extending downward into slot 21. One example of such objects 25 is the previously mentioned instrument bodies for automotive dashboards, and such instrument bodies are generally cup-shaped and have downward extending projections 22. Bolts, screws, and similar items can be supported in the same way. For objects that do not have depending projections, slot 21 is omitted, and path 15 is preferably formed by guides above pile 23. Also, a preferably transparent cover 28 is preferably arranged over pile 23 to keep objects 25 in place, to protect the machine from dirt or damage, and to allow visual inspection of the feed process.

Bristles 24 of pile material 23 are preferably formed of synthetic resin monofilament, and can be obtained in various bristle diameters and lengths and bristle inclinations, depending on the objects to be fed. Bristles 24 are practically noiseless in their engagement with objects 25. They do not mar or damage objects 25, and they are practically unimpaired by dirt, oil, moisture, and other environmental hazards.

Pile material 23 is preferably mounted on a substrate 29 supported on a base 30 that is driven vertically by vibrators 26. Base 30 is upheld by resilient, flexible supports 31, and cover 28 is supported by rods 32 in a fixed position over pile 23.

Figure 12:
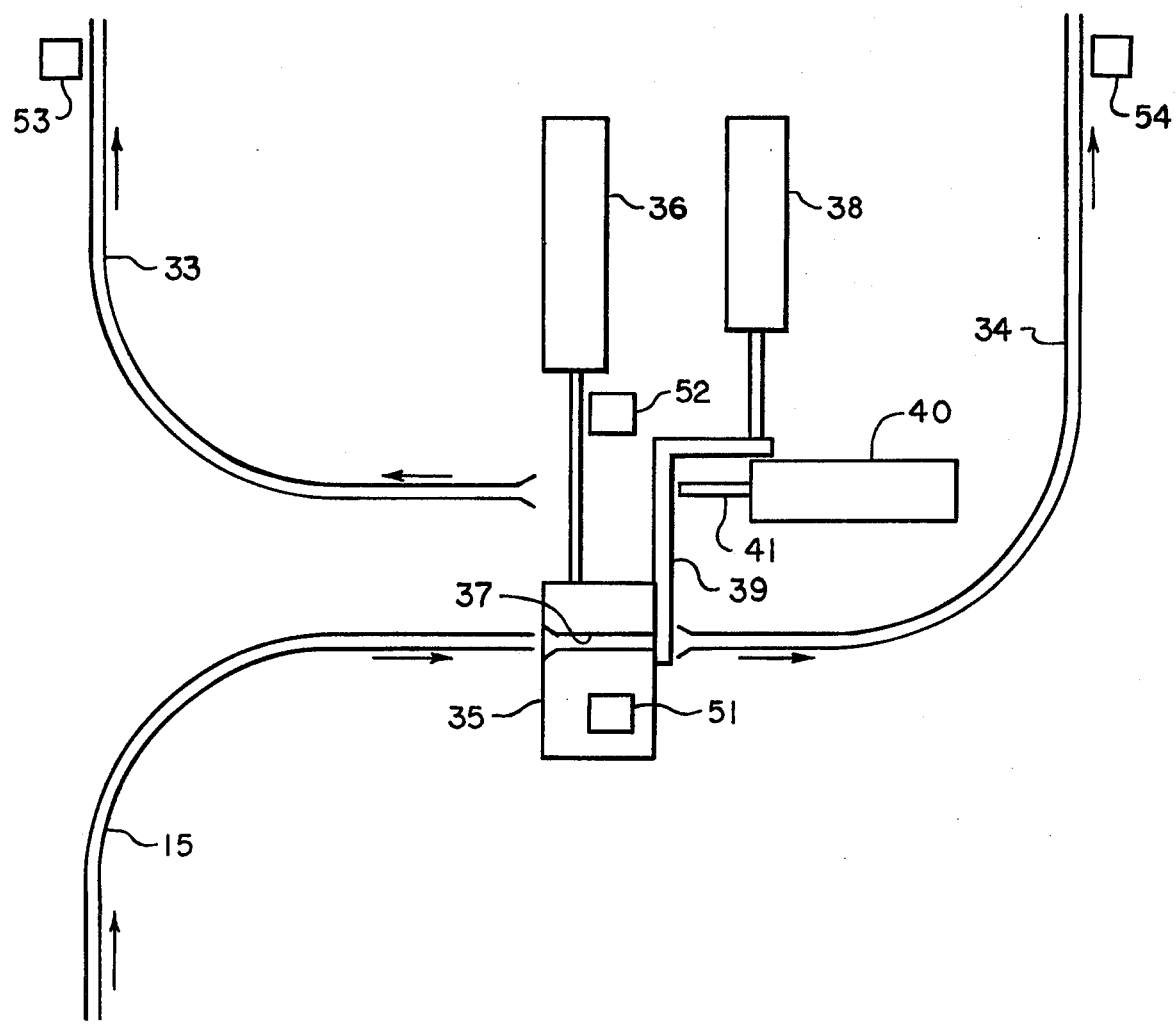
FIG. 12 is a partially schematic, plan view of a preferred embodiment of a two-path output section for the inventive accumulator and feeder.

Output section 20, as shown generally in FIG. 2 and in more detail in FIG. 12, has two output paths 33 and 34 formed by slot 21 in pile material 23, and output of objects 25 is selectively switched between paths 33 and 34. This is accomplished by a transfer slide 35 operated by a solenoid 36. In the position illustrated in FIG. 2, transfer slide 35 allows objects 25 to pass straight through to output path 34, and transfer slide 35 has a through passageway 37 making this possible. To transfer objects 25 to output path 33, a solenoid 38 positions a barrier 39 over the outlet from the through passageway 37 of transfer slide 35, and after an object 25 has entered slide 35, solenoid 36 moves slide 35 to align passageway 37 with output path 33; and then another solenoid 40 operates a pusher 41 to push object 25 into output path 33. Bristles 24 of pile material 23 are inclined toward the direction of the arrows along output paths 33 and 34 so that objects 25 follow the desired course when output selection 20 is vibrated by vibrators 26. Solenoids 36, 38, and 40 are synchronized in their operation and controlled so that objects 25 can all be directed along either output path or can be directed alternately between output paths 33 and 34. Control of the flow of objects 25 in output paths 33 and 34 can be either manual or automatic, depending upon the operations at the station 12 receiving objects 25.

As best shown in FIG. 12, a sensor 51 detects the presence of an object 25 in transfer slide 35, and another sensor 52 detects the presence of an object 25 transferred by slide 35 into alignment with output path 33. Another pair of sensors 53 and 54 detect the presence of objects 25 respectively along output paths 33 and 34. Sensors 51–54 are then arranged in logic and switching circuitry to control the output of objects 25. For example, if sensor 54 remains in an "objects present" state for a predetermined interval, then output path 34 is filled with a standing line of objects 25 back to sensor 54. This is used to switch output of objects 25 into output path 33 by operation of solenoids 36, 38, and 40 in response to sensors 51 and 52. When sensor 51 detects the presence of an object 25 in transfer slide 35, its output is used to actuate transfer solenoid 36 to move slide 35 into alignment with output path 33. Completion of this is detected by sensor 52, whose output is used to operate solenoid 40 to push object 25 into output path 33. After operation of solenoid 40, transfer slide 35 is moved back into the illustrated position to receive another object, and so long as output path 33 remains open and output path 34 remains blocked, solenoid 38 holds gate 39 in the illustrated position blocking output path 34. If circumstances change and objects being moving again in output path 34, as detected by sensor 54 and its associated timing and logic circuitry, solenoid 38 is actuated to remove gate 39 so that objects 25 can pass straight through the slot 37 in transfer slide 35 to exit along output path 34.

Many variations in the logic, synchronization, and operation of multiple-output paths are possible, and as explained in more detail below, components and circuitry are commercially available for a wide variety of operational possibilities. These can include alternate outputs between paths 33 and 34, output exclusively into path 34 until it is filled with objects, manual selection of the output mode between paths 33 and 34, and many other possibilities.

If all the sections of accumulator and feeder 10 vibrated continuously, a substantial feed pressure would build up as machine 10 filled with objects 25, because each section would be forcing objects 25 into the next, and if all the sections were full, their feed force would be added from section to section. This could build up enough feed pressure to jam or dislodge objects 25, and it would also be a waste of energy and produce needless wear in machine 10. According to the invention, the sections 16-20 of machine 10 are preferably independently operated to vibrate sections only as needed, and to shut off vibrators for sections when objects cannot be advanced by operating the vibrators.

Figure 6:
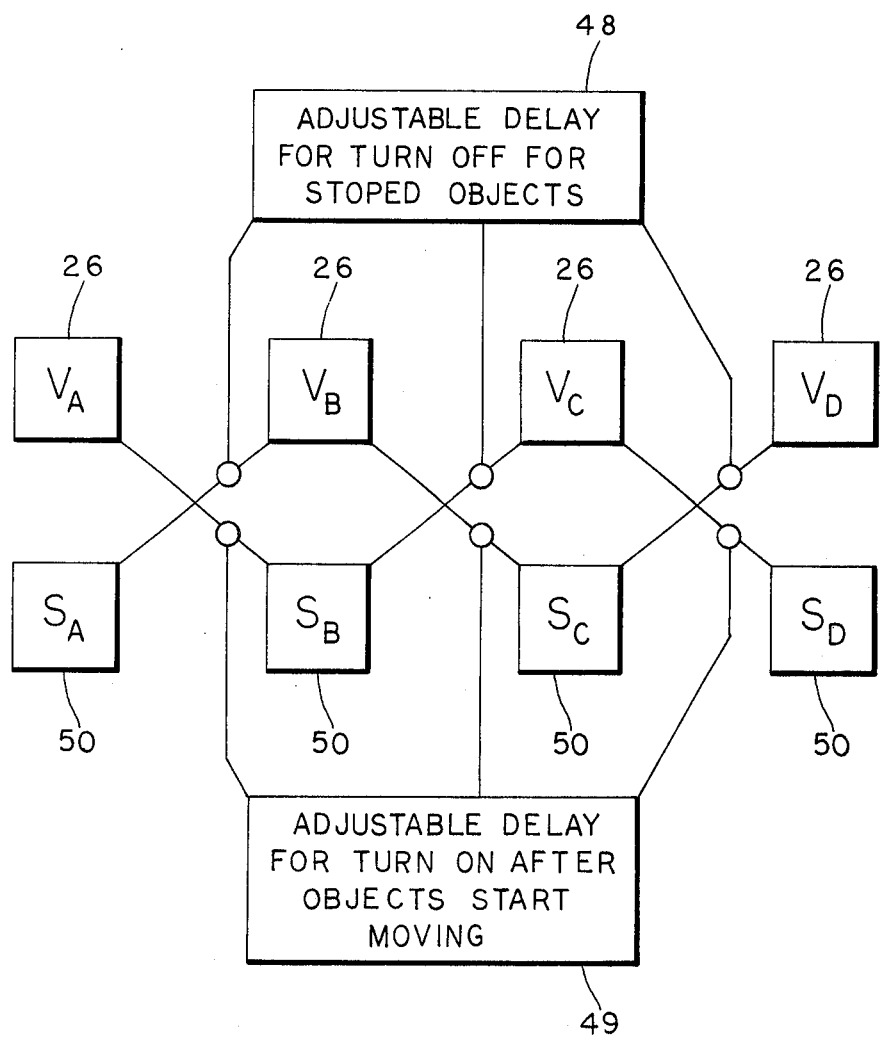
FIG. 6 is a schematic block diagram of the relationship between sensors and vibrators for the accumulator and feeder of FIG. 2.

The way this works is each section has a sensor 50 alongside path 15 for sensing the presence of objects 25 in the vicinity of sensors 50. As best shown in FIG. 2, sensors 50 are arranged near the output end of each section, although sensors 50 can also be placed in other positions. Output section 20 is preferably vibrated any time an output is desired, and section 19 is preferably vibrated any time section 20 is operating. Otherwise, the other sections of accumulator and feeder 10 are preferably interrelated as schematically shown in FIG. 6.

Each of the sensors 50 preferably has a two-state output to serve as a binary device producing one output when an object 25 is adjacent a sensor 50, and another output when no object 25 is adjacent a sensor 50. Sensors 50 are preferably proximity sensors using an RF excitation to produce an electromagnetic field around each sensor 50. The shape and intensity of the electromagnetic field can be altered by the design of the sensor and is preferably made to intersect the path 15 adjacent each sensor 50. Assuming that objects 25 are made of conductive metal, they distort the electromagnetic field of each sensor as they enter the sensing region adjacent a sensor 50. This affects the load reflected to an oscillator producing the RF excitation, and an amplitude detector in the control amplifier detects the loading change and at a predetermined threshold amplitude, causes a step change in output. This allows a zero output ot be produced whenever no metallic object 25 is in the sensing area adjacent a sensor 50, and a digital one or positive output to be produced whenever an object 25 is in the sensing region adjacent a sensor 50. The two-state output from each sensor 50 is directed to generally known logic and timing circuiry to accomplish the results described below.

A line of satisfactory sensors 50 is presently being marketed by the Electro Corporation, 1845 57th Street, Sarasota, Fla. 33580, under the brand VERSA-PROX. In addition to sensors 50, logic modules allowing "and", "or", time delay switching, and other functions are available to cooperate with the sensors. Available components can be interconnected in various ways to achieve various results, and preferred arrangements for accumulator and feeder 10 are described below.

In addition to proximity sensors 50, other sensing devices can produce a similar result. For example, photoelectric cell circuits can be used to produce one output signal for an unbroken light path indicating no object present, and another output signal for an interrupted light path indicating presence of an object. Proximity sensors other than the ones described above are also possible, and sensors are available that operate on capacitive effects. Also, electromechanical sensors such as microswitches can produce one output when engaged by an object and another output when not engaged by an object. Those skilled in the art will appreciate how to use the available two-state output sensing devices, depending upon the configuration and material of objects 25, and space, cost, and other limitations to be considered.

Sensors 50, as associated with timing means, are also in circuits including the vibrators 26 for each section of accumulator and feeder 10. Where the output currents from the timing circuits associated with sensors 50 is relatively low, relays are preferred for switching vibrators 26 on and off, and preferred arrangements for timing and switching are explained in more detail below.

In FIG. 6, vibrators 26 are identified by the letter V and vibrators for successive sections of the accumulator and feeder are identified by subscript letters A, B, C, and D. Sensors 50 for each section are identified by the letter S and have correponding subscript section letter identifications. With sensors 50 arranged near the output region for each section, the general rule is preferably that a succeeding section vibrator is shut off when objects stop moving in the preceding section, and a preceding section vibrator is turned on after objects start to move in a succeeding section.

Different time intervals are preferred for turning vibrators off and turning vibrators back on, and the optimum time intervals depend on several factors. If objects 25 are moving by a sensor 50 in a regular sequence, the output from the sensor switches back and forth between the two states in fairly brief periods indicating flow of objects 25. When objects 25 accumulate in path 15 in a standing-still condition, and the standing line of objects 25 accumulates to the region of a sensor 50, the sensor then remains in its "object present" output state until the objects begin to move again. Timing circuitry associated with each sensor 50 can detect the sustained "object present" state by an uninterrupted "object present" output from a sensor continuing for a relatively brief interval on the order of a few seconds. This indicates that objects are standing still at the particular sensor, and depending upon the location of the sensor, this information is used by producing an output from the timing circuiry, preferably through a relay, to switch off a vibrator 26 that is not needed to vibrate a line of objects 25 that are not moving anyway.

When objects that have been standing still adjacent a sensor 50 begin to move in response to an output demand, the sensor changes from the "object present" state to a zero or "no object present" output state, and this change in output of a sensor 50 is used by a timing circuit to turn on the appropriate vibrator 26 to move upstream objects toward the sensor where the objects are beginning to move. The turning on of a vibrator 26 can be delayed by many seconds, or even minutes, depending on the potential speed of objects 25 moving along path 15, relative to the potential output rate from accumulator and feeder 10. For example, if an upstream section can move its accumulated objects into a downstream section within 5 minutes, but ten minutes are required to output the total number of objects can be accumulated in one section, then an upstream vibrator can be turned on 4 or 5 minutes after objects begin moving in a downstream section, because the objects can quickly catch up with the downstream flow. Also, the delay interval for turning on the vibrators for an upstream section is preferably variable to adjust the machine to differnt objects and feeding rates.

The preferred operation of accumulator and feeder 10 is schematically illustrated in FIG. 6 using timer circuitry 48 for turning off vibrators shortly after objects stop moving in a section, and timer circuitry 49 for turning on upstream vibrators at the expiration of an adjustable delay after objects start moving in downstream sections. Section D will be the first to fill up with objects, and as a standing line of objects extends through the full length of section D and back to the sensor 50 of section C, timer circuitry 48 responds to the lack of movement of objects sensed by sensor 50 in section C, and after a suitable interval of lack of motion of objects 25, shuts off the vibrator for section D. Section D is then filled with objects, but unable to move objects downstream, and is shut off until a downstream demand for objects occurs. If conditions remain unchanged and objects continue to enter the accumulator and feeder, they will fill up section C and form a stopped line reaching back to the sensor 50 of section B, whereupon timer circuitry 48 will shut off the vibrator for section C after a predetermined interval of stoppage of motion past the sensor 50 for section B. A similar process occurs if the stopped line of objects extends back to the sensor 50 for section A resulting in timer mechanism 48 shutting off the vibrator 26 for section B.

When a downstream demand for objects 25 occurs, the vibrators for Section D are energized, and objects begin moving out of section D. Sensor 50 of section D then changes state when the previously motionless object moves out of its sensing region. Timer circuitry 49 responds to this, and after a suitable delay interval, switches on the vibrator for section C. Section C then begins vibrating to input objects into sectin D and replenish the objects output from section D. Sensor 50 in section C then detects movement of objects in section C feeding into section D and changes state in response, and timer circuitry 49 responds to this to turn on the vibrator of section B after a suitable interval. If the feed rate through each section is fairly fast compared to the potential output rate, then timer circuitry 49 can be set for a longer delay before starting up a preceding section, because any section can quickly catch up with the downstream feed. If the feed rate through the accumulator and feeder is only slightly faster than the potential output, then upstream sections are turned on fairly quickly by timer 49 upon detection of downstream movement.

Figure 9:
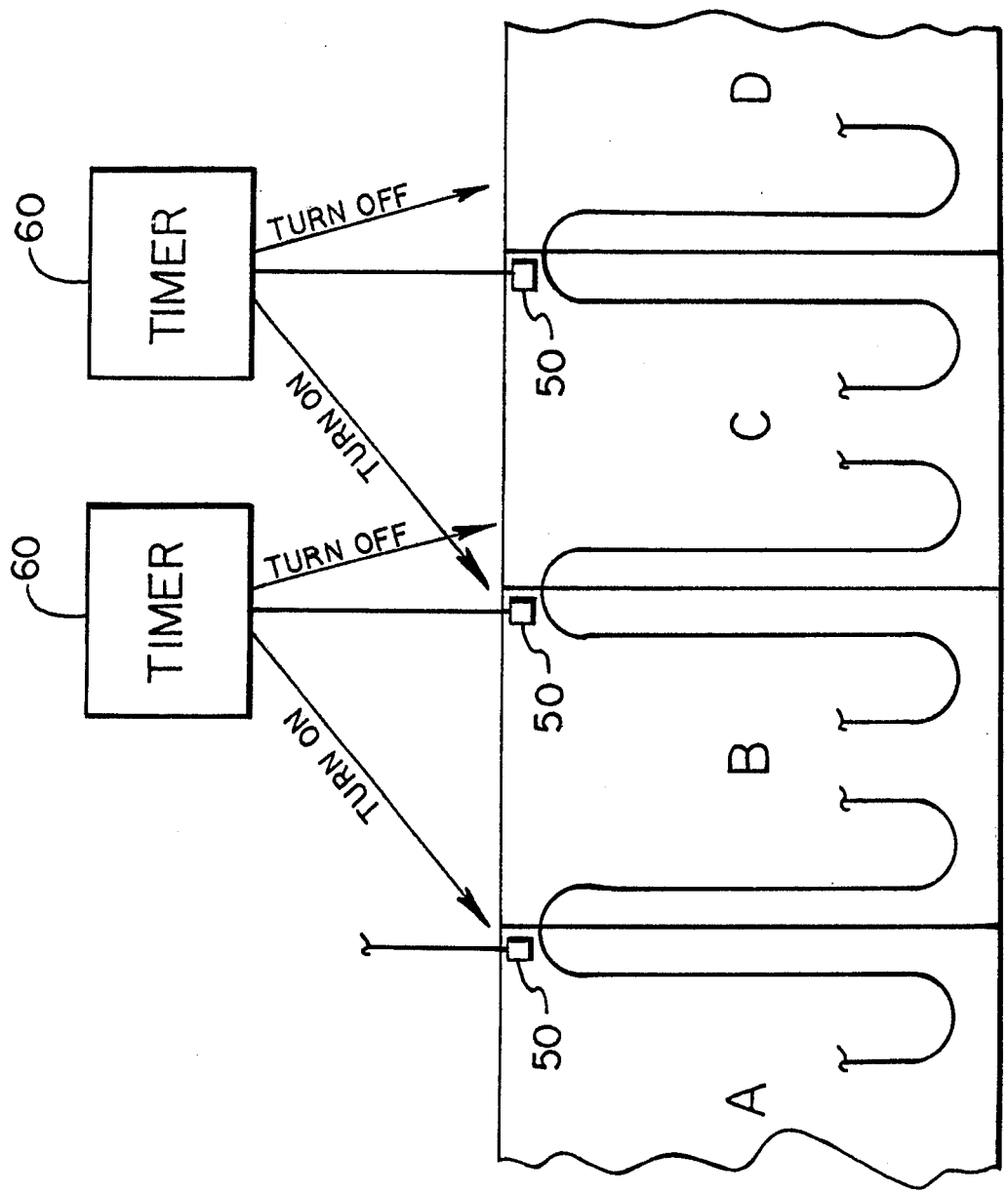

Another way of illustrating the same arrangement is shown in FIG. 9 where sensors 50 feed their two output states to timer circuits 60 that are capable of both "delayed make" and "delayed break" switching of vibrators for sections A-D, preferably through relays (not shown). When a standing line of objects reaches back through section D to the sensor 50 at the output of section C, sensor 50 assumes the steady "object present" state detected by timer circuitry 60 which then promptly turns off section D. Similarly, if a standing line of objects in section C extends back to the sensor 50 at the output of section B, timer circuitry 60 responds to this and shuts off section C. When a downstream demand occurs, and vibrators for sectins D and C are switched on in the usual sequence, the sensor 50 for section C switches from the steady "object present" output state, and this triggers timer circuitry 60 to measure a predetermined delay interval and then switch on the vibrators for section B to move upstream objects into section C to keep objects flowing as long as the downstream demand continues. As objects begin moving past the sensor 50 of section B, timer circuitry 60 is triggered for measuring a delay interval and then switching on the vibrators for upstream section A to replace the objects moved out of section B.

Figure 8:
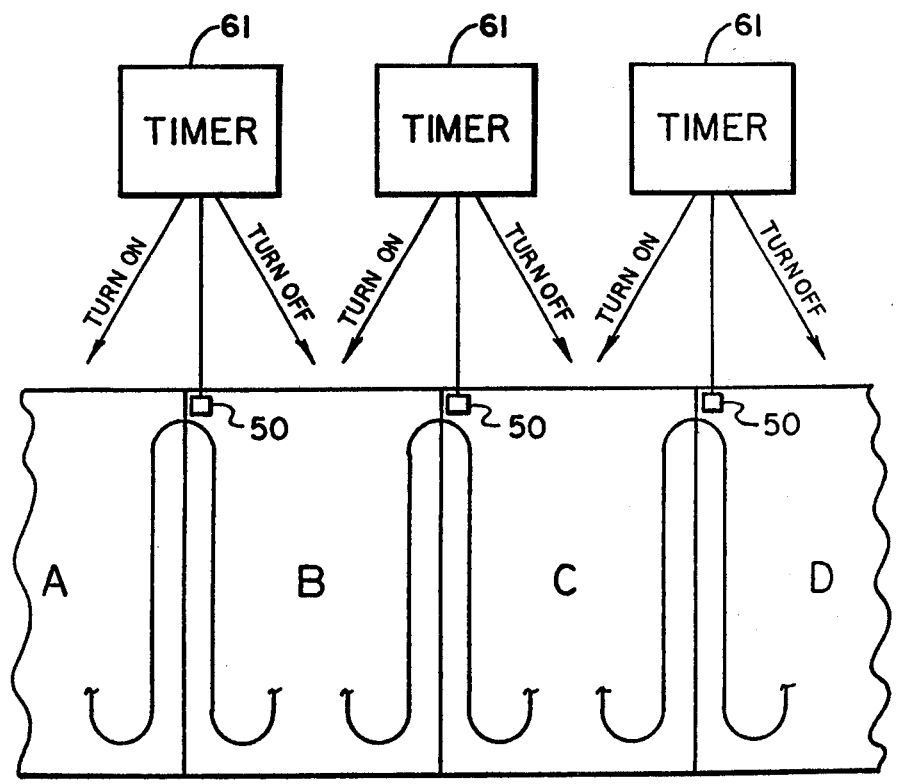
FIGS. 8 and 9 are partially schematic, plan views showing relationships between sensors and timers for two preferred embodimens of the invention.

Another way the accumulator and feeder 10 can be operated is schematically shown in FIG. 8 where sensors 50 are arranged near the input of each of the section A-D and feed their outputs to timer circuitry 61. The same general result is then accomplished with a slightly different logic. When a standing line of objects extends back through section D to the sensor 50 of section D, timer circuit 61 notes the steady "object present" output state of sensor 50 of section D and promptly turns off the vibrators for section D. Sections C and B are also sequentially turned off when standing objects extend back to their respective sensors 50 as determined by the steady "object present" output detected by timing circuitry 61. When section D is turned on in response to downstream demand, objects begin moving past the sensor 50 of section D, which then changes from its steady "object present" output state, and this triggers timer 61 to measure a delay interval and then switch on the vibrators for section C. When this occurs, objects begin moving past the sensor 50 of section C, which changes state in response, and this initiates a timed interval in timing circuit 61 for later switching on section B. This sequence is repeated back to the first stage of the accumulator and feeder until all the sections are vibrating and objects are moving along to supply the downstream demand.

At any time a section completely fills with objects that extend in a motionless line back to the sensor for that section, the section is shut off and will not be switched on until an interval after objects begin moving in the downstream section. The starting and stopping of vibrators is then cascaded up and down the accumulator and feeder to feed the objects on demand, with preferably the final output stage vibrating at all operating times, to accumulate as large a number of objects as is desired by providing the appropriate number of sections, and for shutting off any sections that are not needed to move the objects along.

Figure 10:
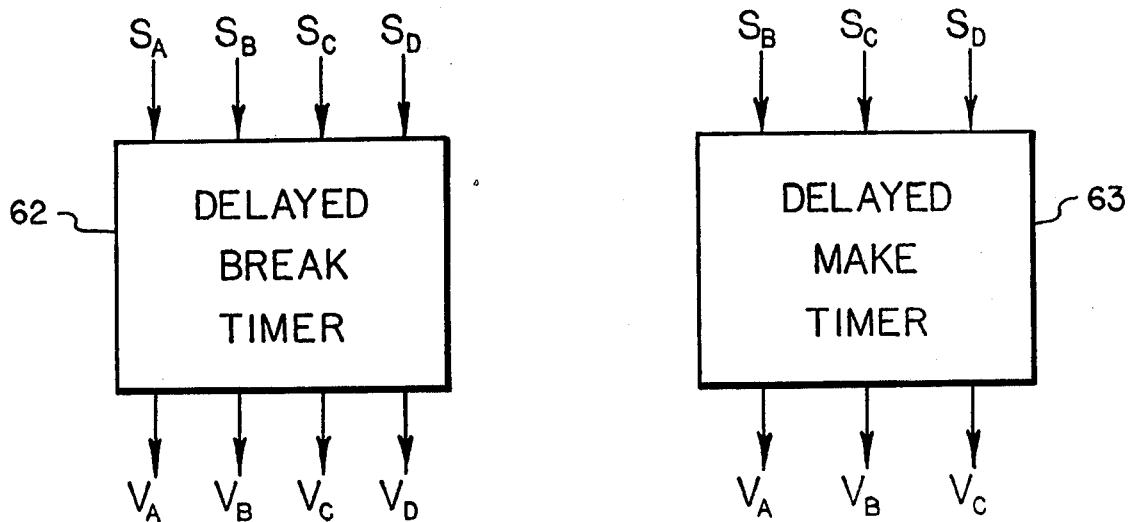
FIGS. 10 and 11 are schematic views of the operation of the embodiments of FIGS. 8 and 9 respectively.
Figure 11:
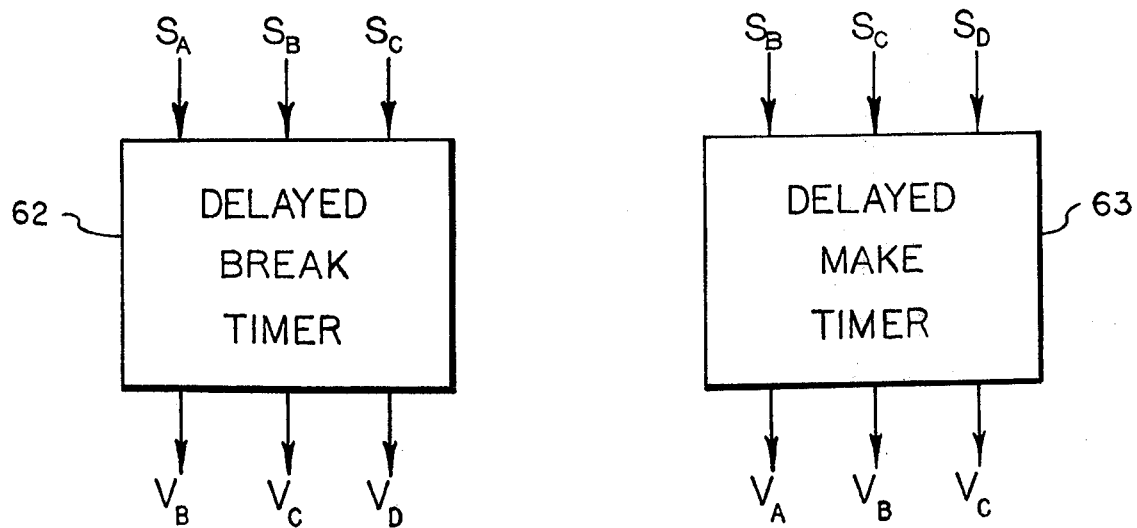

FIGS. 10 and 11 schematically illustrate the arrangements of FIGS. 8 and 9 respectively in association with a delayed-break timer circuit 62 and a delayed-make timer circuit 63 with sensors identified by "S" with a subscript letter for each respective section, and with vibrators identified by a "V" with a subscript letter for each respective section. The components described above as available from the Electro Corporation under the brand name VERSA-PROX provide everything that is needed, including instructions on mounting, assembly, and interconnection, so that those skilled in the art can apply the logic patterns described above to an accumulator and feeder according to the invention. Other logic patterns can also be used, and those skilled in the art will appreciate the different sensors, components, and timing arrangements that can be used.

Separate timing and logic elements are preferred for sensors 51-54 of the output stage 20 described above relative to FIGS. 2 and 12, but components for these operations are also readily available in the market and can be assembled with generally known sensors and timing circuitry. Actuators such as electric motors or pneumatic or hydraulic cylinders can be substituted for solenoids in the output stage 20, and additional sensors can be used in the accumulator and feeder if desired. For example, one sensor can be associated with a timing circuit for shutting off the vibrators for each section, and another sensor can be associated with another timing circuit for starting the vibrators in each section. Adjustability of start-up timing intervals for switching on vibrators is preferred to adapt the accumulator and feeder to various circumstances, but an accumulator and feeder can be made without adjustable time intervals, once the proper timing intervals have been established for the objects and feed rates in question.

I claim:

1. An object accumulator and feeder having an input end and an output end and comprising:
   a. means for forming a relatively long path for said objects to move in succession in a row from said input end to said output end of said accumulator and feeder, said path being at least several times as long as the distance from said input end to said output end;
   b. an upper surface of said path forming means bearing a pile material formed of bristles having tips supporting said objects and being inclined toward a direction of feed for moving said objects along said path from said input end toward said output end;
   c. said path forming means being divided into a series of independently operable sections;
   d. means for vibrating each of said sections independently for vibrating said pile bristles against said objects to advance said objects along said path;
   e. a sensor arranged at a sensing region along said path in each of said sections, said sensor having an output distinguishably responsive to the presence or absence of one of said objects in said sensing region;
   f. timing means arranged for receiving and respnding to said output from each respective one of said sensors;
   g. said timing means being in circuit with said vibrating means;
   h. said timing means being arranged for switching off a predetermined one of said vibrating means at the end of a predetermined interval of said output of a preassociated one of said sensors remaining responsive to the presence of one of said objects in said sensing region;
   i. said timing means being arranged for switching on a predetermined one of said vibrating means at the end of a predetermined interval after said output of a preassociated one of said sensors changes from responsiveness to the presence of one of said objects in said sensing region to responsiveness to absence of one of said objects from said sensing region; and
   j. said switching of said vibrating means on and off by said timing means being arranged to accumulate said objects by successively filling up said sections with said objects lined up in said row along said path from said output end toward said input end, to feed said objects along said path toward said output end on demand, and to shut off selected ones of said vibrating means to reduce the feeding force on said objects for intervals during which said sections driven by said selected ones of said vibrating means are filled with said objects.

2. The accumulator and feeder of claim 1 wherein said path is formed as multiple S curves.

3. The accumulator and feeder of claim 1 wherein said pile material is arranged on opposite sides of a slot extending along said path, each of said objects has a depending portion extending into said slot while an upper portion of said objects rests on said bristle tips adjacent to said slot, and said depending portion of said objects has a dimension wider than said slot to keep said objects oriented by preventing rotation of said depending portions in said slot.

4. The accumulator and feeder of claim 1 including means for output of said objects from said output end of said accumulator and feeder, said output means including two paths for said objects and means for directing successive ones of said objects alternately into said two paths.

5. The accumulator and feeder of claim 4 wherein said output paths have said pile material, and including means for vibrating said output means to vibrate said pile bristles against said objects to feed said objects through said output paths.

6. The accumulator and feeder of claim 4 wherein said pile material is arranged on opposite sides of a slot extending along said path, each of said objects has a depending portion extending into said slot while an upper portion of each of said objects rests on said bristle tips adjacent said slot, and said depending portion of each of said objects has a dimension wider than said slot to keep said objects oriented by preventing rotation of said depending portions in said slot.

7. The accumulator and feeder of claim 1 wherein said timing means is adjustable for varying said interval for said switching on of said vibrating means.

8. The accumulator and feeder of claim 1 wherein said sensing regions and said sensors are arranged in output regions of each of said sections, and said predetermined one of said vibrating means switched off by said timing means is for the one of said sections succeeding the section where said preassociated sensor is located, and said predetermined one of said vibrating means switched on by said timing means is for the one of said sections preceding the section where said preassociated sensor is located.

9. The accumulator and feeder of claim 8 wherein said path is formed as multiple S curves.

10. The accumulator and feeder of claim 8 wherein said pile material is arranged on opposite sides of a slot extending along said path, each of said objects has a depending portion extending into said slot while an upper portion of each of said objects rests on said bristle tips adjacent said slot, and said depending portion of each of said objects has a dimension wider than said slot to keep said objects oriented by preventing rotation of said depending portion in each slot.

11. The accumulator and feeder of claim 8 wherein said timing means is adjustable for varying said interval for said switching on of said vibrating means.

12. The accumulator and feeder of claim 8 including means for output of said objects from said output end of said accumulator and feeder, said output means including two paths for said objects and means for directing successive ones of said objects alternately into said two paths.

13. The accumulator and feeder of claim 12 wherein said output paths have said pile material, and including means for vibrating said output means to vibrate said pile bristles against said objects to feed said objects through said output paths.

14. The accumulator and feeder of claim 1 wherein said sensing regions and said sensors are arranged in input regions of each of said sections, and said predetermined one of said vibrating means switched off by said timing means is for the one of said sections where said preassociated sensor is located, and said predetermined one of said vibrating means switched on by said timing means is for the one of said sections preceding the section where said preassociated sensor is located.

15. The accumulator and feeder of claim 14 wherein said path is formed as multiple S curves.

16. The accumulator and feeder of claim 14 wherein said pile material is arranged on opposite sides of a slot extending along said path, each of said objects has a depending portion extending into said slot while an upper portion of each of said objects rests on said bristle tips adjacent said slot, and said depending portion of each of said objects has a dimension wider than said slot to keep said objects oriented by preventing rotation of said depending portion in each slot.

17. The accumulator and feeder of claim 14 wherein said timing means is adjustable for varying said interval for said switching on of said vibrating means.

18. The accumulator and feeder of claim 14 including means for output of said objects from said accumulator and feeder, said output means including two paths for said objects and means for directing successive ones of said objects alternately into said two paths.

19. The accumulator and feeder of claim 18 wherein said output paths have said pile material, and including means for vibrating said output means to vibrate said pile bristles against said objects to feed said objects through said output paths.

* * * * *